United States Patent [19]

Schoennagel

[11] 4,264,475

[45] Apr. 28, 1981

[54] BIMETALLIC REFORMING CATALYST CONTAINING SEPARATE PLATINUM-CONTAINING AND IRIDIUM-CONTAINING PARTICLES

[75] Inventor: Hans J. Schoennagel, Lawrenceville, N.J.

[73] Assignee: Mobil Oil Corporation, New York, N.Y.

[21] Appl. No.: 76,047

[22] Filed: Oct. 30, 1979

Related U.S. Application Data

[63] Continuation-in-part of Ser. No. 934,143, Aug. 16, 1978, abandoned.

[51] Int. Cl.$^3$ .................... B01J 27/08; B01J 27/10; B01J 23/42
[52] U.S. Cl. ............................ 252/441; 252/472; 252/466 PT
[58] Field of Search .............. 252/441, 466 PT, 472, 252/474

[56] References Cited

U.S. PATENT DOCUMENTS

| | | |
|---|---|---|
| 2,848,377 | 8/1958 | Webb ................................ 208/138 |
| 2,854,400 | 9/1958 | Weisz ................................ 208/111 |
| 2,854,403 | 9/1958 | Weisz ................................ 208/138 |
| 2,854,404 | 9/1958 | Prater et al. ..................... 208/139 |
| 3,953,368 | 4/1978 | Sinfelt ............................... 208/139 |

FOREIGN PATENT DOCUMENTS 2627822  2/1977  Fed. Rep. of Germany.

*Primary Examiner*—Patrick Garvin
*Attorney, Agent, or Firm*—Charles A. Huggett; Charles J. Speciale

[57] ABSTRACT

Catalyst compositions are provided consisting essentially of a refractory support about 0.1 to about 5 percent by weight of platinum, about 0.1 to about 5 percent by weight of iridium and about 0.1 to about 5 weight percent of halogen, where the platinum and iridium are contained on separate particles of support. The relative weight ratio of the particles containing platinum are those containing iridium is between about 10:1 and about 1:10. The compositions are useful as hydrocarbon conversion catalysts and are especially applicable for use in catalyzing the reforming of naphtha petroleum fractions.

28 Claims, 1 Drawing Figure

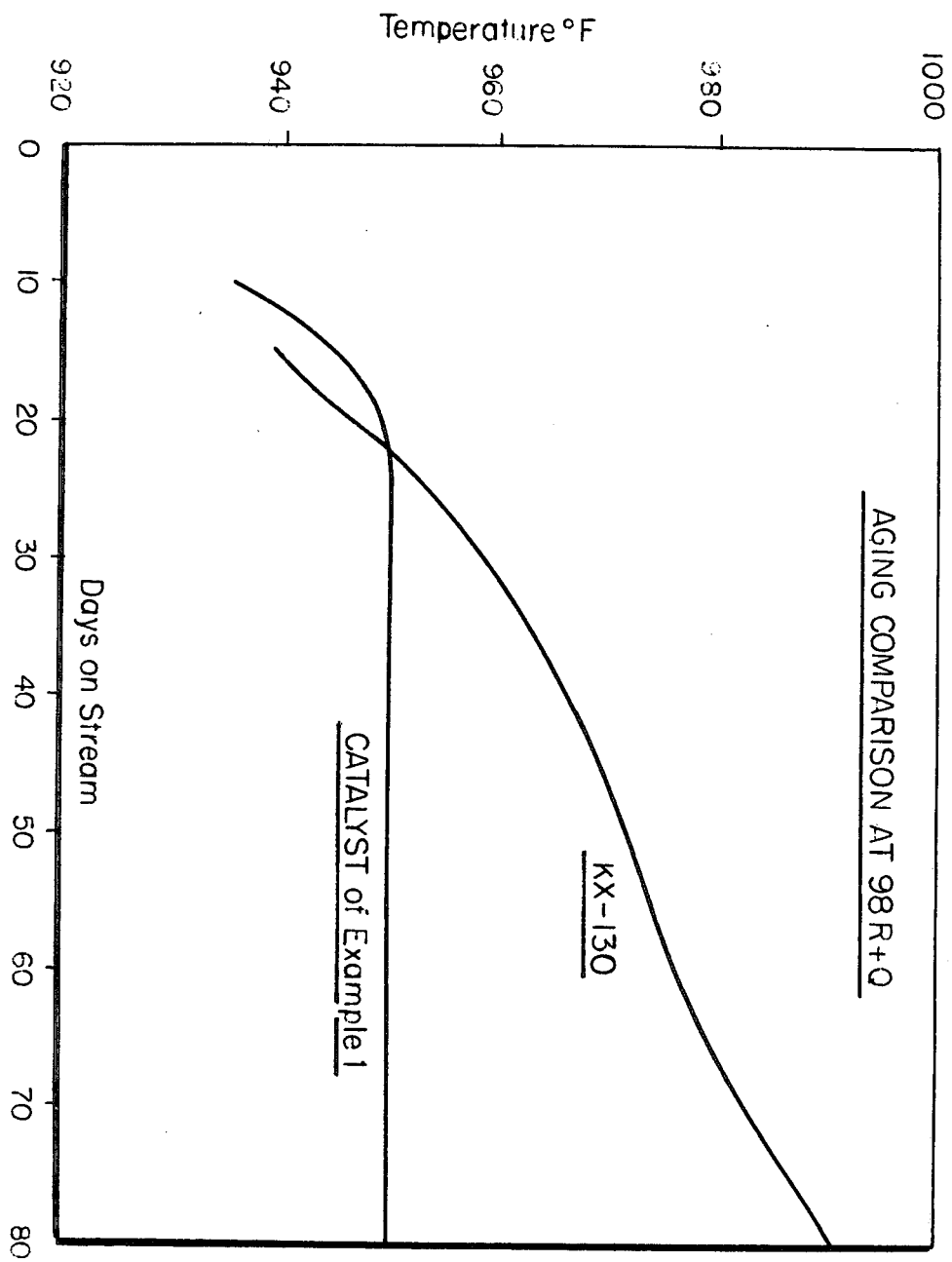

BIMETALLIC REFORMING CATALYST CONTAINING SEPARATE PLATINUM-CONTAINING AND IRIDIUM-CONTAINING PARTICLES

This application is a continuation-in-part of copending application Ser. No. 934,143, filed Aug. 16, 1978 and now abandoned.

BACKGROUND OF THE INVENTION

1. Field of the Invention

This invention relates to a catalyst composition containing platinum and iridium, where each of such metal components are contained on separate particles of a refractory support and to the reforming of selected petroleum fractions in the presence of this catalyst to obtain gasoline of high octane number.

2. Description of the Prior Art

Catalysts intended for use in reforming operations wherein hydrocarbon fractions such as naphthas or gasolines or mixtures thereof are treated to improve the anti-knock characteristics thereof are well known in the petroleum industry.

It has heretofore been proposed to employ platinum metal-containing catalysts for promoting reforming. Such catalysts are necessarily characterized by a certain amount of acidity. One type of reforming catalyst which has been used commercially consists of an alumina base material having platinum metal impregnated thereon, with the acidity characteristic being contributed by a small amount of halogen incorporated in the catalyst.

In more recent years, multimetallic reforming catalysts, for example, bimetallic catalysts, have come into use. These catalysts generally contain platinum, together with one or more additional metals such as rhenium, germanium, iridium, palladium, osmium, ruthenium, rhodium, copper, silver, tin or gold deposited on a refractory support which also contains a specified amount of halogen. Representative of multimetallic reforming catalysts are those containing platinum and iridium, such as described in U.S. Pat. No. 2,848,377 and more recently in U.S. Pat. No. 3,953,368. The latter patent reports certain advantages when platinum and iridium are present on a refractory support as highly dispersed polymetallic clusters in which metallic atoms are separated by distances of about 2.5 to 4.0 Angstroms.

It has also heretofore been known to conduct catalytic reforming utilizing a catalyst consisting essentially of a particularly defined mixture of particles of a porous carrier impregnated with a small amount of platinum and particles of an acidic cracking component. Representative disclosures of such prior art are to be found in U.S. Pat. No. 2,854,400; 2,854,403 and 2,854,404. Also, it has been suggested, for example, in German O.S. No. 2,627,822 to conduct reforming in the presence of a catalyst constituting a mixture of platinum on one solid carrier and rhenium on a second solid carrier.

All of the above catalysts, while possessing certain advantages, suffer from inherent deficiencies in either activity, stability or sensitivity to poisons, e.g., sulfur, under severe reforming conditions. The ability of a reforming catalyst to provide a high yield of gasoline of high octane number over an extended period of time is, as will be realized, a highly desirable attribute, which has long been sought but not fully attained prior to the advent of the present invention.

SUMMARY OF THE INVENTION

In accordance with the invention described herein reforming of a hydrocarbon charge, such as a naphtha can be effectively carried out over an extended period of time to provide a high yield of gasoline of high octane number when the reforming is conducted in the presence of a catalyst comprising a mixture of a minor proportion of platinum on a support and a minor proportion of iridium on a separate support. More particularly, the catalyst comprises a refractory support, about 0.1 to about 5 weight percent of platinum, about 0.1 to about 5 weight percent of iridium and about 0.1 to about 5 weight percent of halogen, with the platinum and iridium being deposited on separate particles of the support.

The relative weight ratio of the separate particles containing platinum and those containing iridium is generally between about 10:1 and about 1:10. The dimensions of the separate particles may range from powder size, e.g., 0.01 micron up to particles of substantial size, e.g., 10,000 microns. Preferably, the particle size is between about 1 and about 3000 microns.

The refractory support is contemplated as being an inorganic oxide and usually alumina, of the gamma or eta variety. The halogen component of the catalyst is present on both the particles containing platinum and those containing iridium. Halogen may be chlorine, bromine or fluorine, with particular preference being accorded chlorine. Thus, preferred embodiments of the invention include catalysts comprising separate particles of alumina base, containing a minor amount of chlorine, some of such particles having platinum deposited thereon and other of such particles having iridium deposited thereon, with the weight ratio of platinum to iridium being between about 10:1 and about 1:10 and preferably between about 5:1 and 1:5.

Reforming utilizing the described catalyst is conducted in the presence of hydrogen under reforming conditions. The latter include a temperature between about 700° F. and about 1100° F. and more usually between about 800° F. and about 1000° F.; a pressure within the range of about 50 to about 1000 psig and preferably between about 100 and about 700 psig and a liquid hourly space velocity of between about 0.1 and about 10 and preferably between about 0.5 and about 4. The molar ratio of hydrogen to hydrocarbon charge is generally between about 0.5 and about 20 and preferably between about 2 and about 12.

BRIEF DESCRIPTION OF THE DRAWING

The single FIGURE of the drawing shows the comparative reforming performance of the catalyst of the invention with a commercially available catalyst of similar chemical composition.

DESCRIPTION OF SPECIFIC EMBODIMENTS

Following the teachings of this invention, it has been found that substantial increase in stability and activity, at the same selectivity, are attainable for reforming catalysts comprising a refractory support and specified minor amounts of platinum, iridium and halogen, providing the platinum and iridium components are deposited on separate particles of the support. The relative weight ratio of the particles containing platinum and those containing iridium should be between about 10:1 and about 1:10. The size of the separate particles may range from powder of about 0.01 micron to particles of about 10000 microns. Preferably, the size of the particles will be within the approximate range of 1 to 3000 microns, with the size of the platinum-containing and iridium-containing particles either being of differing size within the above range or of substantially the same size.

Charge stocks undergoing reforming, using the catalyst described herein, are contemplated as those conventionally employed. These include virgin naphtha, cracked naphtha, gasoline, including FCC gasoline, or mixtures thereof boiling within the approximate range of 70° to 500° F. and, preferably within the range of about 120° to about 450° F. The charge stock is contacted in the vapor phase with the catalyst at a liquid hourly space velocity between about 0.1 and about 10 and preferably between 0.5 and about 4. Reaction temperature is within the approximate range of 700° F. to 1100° F. and preferably between about 800° F. and about 1000° F. Hydrogen may be added to the reaction zone at a rate corresponding to a mole ratio of hydrogen to hydrocarbon charge of between about 0.5 and about 20 and preferably between about 100 and about 700 psig. Since the reforming process produces large quantities of hydrogen, at least a portion thereof may be conveniently employed for the introduction of hydrogen with the feed.

The refractory support of the present catalyst is a porous adsorptive material having a surface area exceeding 20 square meters per gram and preferably greater than about 100 square meters per gram. Refractory inorganic oxides are preferred supports, particularly alumina or mixtures thereof with silica. Alumina is particularly preferred and may be used in a large variety of forms including alumina, precipitate or gel, alumina monohydrate, sintered alumina and the like. Various forms of alumina either singly or in combination, such as eta, chi, gamma, theta, delta or alpha alumina may be suitably employed as the alumina support. Preferably, the alumina is gamma alumina and/or eta alumina. The above nomenclature used in the presented specification and claims with reference to alumina phase designation is that generally employed in the United States and described in "The Aluminum Industry: Aluminum and its Production" by Edwards, Frary and Jeffries, published by McGraw-Hill (1930).

The refractory support, desirably alumina, having a particle size of at least about 0.01 mmicron and generally not exceeding about 10,000 microns is contacted with a source of halogen. Both the particles of platinum-containing refractory support and the separate particles of iridium-containing refractory support will contain halogen.

Halogen may be added to the support, preferably alumina, in a form which will readily react therewith in order to obtain the desired results. One feasible method of adding the halogen is in the form of an acid, such as hydrogen fluoride, hydrogen bromide, hydrogen chloride and/or hydrogen iodide. Other suitable sources of halogen include volatile salts, such as ammonium fluoride, ammonium chloride and the like. When such salts are used, the ammonium ions will be removed during subsequent heating of the catalyst. Halogen may also be added as fluorine, chlorine, bromine or iodine or by treatment in gaseous hydroge halide. The halogen, preferably a chlorine or fluorine moiety, may be incorporated into the catalyst at any suitable stage in the catalyst manufacture. Thus, halogen may be added before, after or during incorporation of the platinum and iridium on the separate particles of refractory support. Halogen is conveniently incorporated into the catalyst when impregnating the support with halogen-containing metal compounds, such as chloroplatinic acid and chloroiridic acid. Additional amounts of halogen may be incorporated in the catalyst by contacting it with materials, such as hydrogen fluoride and hydrogen chloride, either prior to or subsequent to the metal impregnation step. Halogen may also be incorporated by contacting the catalyst with a gaseous stream containing the halogen, such as chlorine or hydrogen chloride. One feasible way to halogenate the alumina is by the addition of an alkyl halide, such as tertiary butyl chloride during the reforming operation. The amount of halogen introduced into the support is that the halogen content of the overall catalyst is between about 0.1 and about 5 weight percent. Such halogen content may be deposited on either the platinum-containing or iridium-containing particles, and desirably is present on both particles in an approximate range which may be extended from 1:10 to 10:1 of the total halogen content. Generally, as a preferred and practical matter, the halogen content of each of the particles making up the catalyst of the invention will be approximately the same.

The platinum metal may be deposited on the support, desirably alumina, in any suitable manner. Generally, it is feasible to mix particles of support with a platinum compound such as chloroplatinic acid, platinum tetrachloride, bromoplatinic acid, the ammonium salt of chloroplatinic or bromoplatinic acid.

The iridium metal may be deposited on the support, desirably alumina, by contacting with an appropriate iridium compound such as the ammonium chloride double salt, tribromide, tetrachloride or chloroiridic acid. Iridium amine complexes may also suitably be employed.

The impregnated particles may then be dried in air at an elevated temperature generally not exceeding 250° C. prior to introduction of the catalyst into the reforming unit. Optionally, the catalyst may be exposed to a hydrogen atmosphere to reduce a substantial portion of the platinum component to the elemental state.

While, as above described, it is a preferred embodiment of the invention described herein that the present reforming catalyst consist essentially of a mixture of a minor proportion of platinum on a support and a minor proportion of iridium on a separate support, the catalyst may optionally contain in addition to platinum and iridium, one or several additional catalytic components such as silver, osmium, copper, gold, palladium, rhodium, gallium, rhenium, germanium or tin or compounds thereof on one support and one or more such additional catalytic components on a second support, which also contains the iridium. The amounts of the added catalytic components may be in the approximate range of 0.01 to 2 weight percent, preferably between about 0.1 and about 1.0 weight percent. The platinum content, iridium content and halogen content of catalysts is in the same range as set forth herinabove, with the preferred support being alumina.

A very distinct advantage of the bimetallic reforming catalyst described herein containing separate platinum/alumina and iridium/alumina particles in its ability to maintain its catalytic activity over an extended period of time. In a typical commercial reforming process, reaction temperature is increased during the course of the run to maintain a constant product octane level. Increasing the reaction temperature becomes necessary since the catalyst is continuously deactivated. Generally, the reaction temperature cannot exceed about 1000° F. before rapid deactivation of the catalyst is encountered. Accordingly, as the reaction temperature approaches about 1000° F., it is usually necessary to regenerate the catalyst. Regeneration is accomplished by burning the coke deposit from the catalyst and then treating with chlorine, HCl-oxygen mixtures or organic chloride-oxygen mixtures to rejuvenate the catalyst and thereby restore its activity and selectivity.

It is contemplated that the catalyst described hereinabove may be employed in any of the conventional types of processing equipment. Thus, the catalyst may be used in the form of pills, pellets, extrudates, spheres, granules, broken fragments or various other shapes dispersed as a fixed bed within a reaction zone. The charge stock may be passed through the catalyst bed as a liquid, vapor or mixed phase in either upward or downward flow. The catalyst may also be used in a form suitable for moving beds. In such instance, the charge stock and catalyst are contacted in a reforming zone wherein the charge stock may be passed in concurrent or countercurrent flow to the catalyst. Alternatively, a suspensiod-type process may be employed in which the catalyst is slurried in the charge stock and the resulting mixture conveyed to the reaction zone. The reforming process is generally carried out in a series of several reactors. Usually, three to five reactors are used. The catalyst of the invention may be employed in just one of the reactors, e.g., the first reactor or in several reactors or in all reactors. After reaction, the product from any of the above processes is separated from the catalyst by known techniques and conducted to distillation columns where the various desired components are obtained by fractionation.

In accordance with one embodiment of this invention, it is possible to isolate the platinum-containing portion of the catalyst from the iridium-containing portion since the same are located on separate particles. Thus, should a catalyst of the present invention become deactivated due to the loss of activity of either the platinum-containing or the iridium-containing portion of the catalyst, it is only necessary to activate that portion of the catalyst which is adversely effected rather than the whole catalyst. It is thus possible to provide separate and optimum means for ready regeneration of each of the two components. For example, the catalyst of the present invention after becoming spent, may be separated into its components of platinum-containing components and iridium-containing components by providing the respective particles with a different physical characteristic which permit their ready separation, such as a difference in particle size. The particles of differing size may be separated by flotation, air blowing, sifting or by any of the various other known means for separating physically and/or chemically different materials. The separated platinum-containing and iridium-containing particles may then be separately regenerated under conditions best suited for each.

The ability to select the amount of platinum-containing component and the amount of iridium-containing component making up the ultimate catalyst mixture has the advantage that the amount of platinum, as well as the amount of iridium contained in the catalyst, can be controlled not only by the respective concentrations of the platinum and iridium impregnating solutions used but also by the respective amounts of the platinum-containing and iridium-containing components of the catalyst. If the two-component catalyst of this invention is used in the form of a mixture of particles, the two components of the mixture will be physically independent. Accordingly, a process using catalysts in this form affords substantial flexibility in catalyst composition within the limits noted hereinabove. Thus, in changing type of charge stocks such as between paraffinic and naphthenic stocks, the catalyst composition can be adjusted with respect to activity and/or selectivity for optimum performance in accordance with this invention by adding or withdrawing one or the other of the catalyst components.

It is also within the purview of this invention to select the refractory support most suitable for use with the metal deposited thereon. The separate particles making up the present catalyst afford flexibility in choice of refractory support, such as the type of alumina employed. Thus, in one embodiment it is contemplated that iridium is desirably deposited on the more acidic eta form of alumina with platinum being deposited on the gamma form of alumina. Such catalyst would have the advantage of reducing the amount of light hydrocarbons, such as methane and ethane to yield a stream of hydrogen of enhanced purity, suitable for recycle or other use.

The following examples will serve to illustrate the catalyst and process of the invention without limiting the same.

EXAMPLE 1

Gamma alumina (25 grams), in the form of spheres was ballmilled and the resulting powder elutriated with methanol to separate out those particles having a dimension in the approximate range of 1 to 5 microns.

A 25 gram sample of the resulting powder was impregnated by contacting with 37.5 ml of an aqueous solution containing 0.15 gram of platinum present as hexachloroplatinic acid. The slurry of alumina in platinum-containing solution was maintained for about 1 hour, thereafter the water was driven off and the resulting product dried overnight at 110° C. and then calcined for 4 hours at 250° C. to provide a material containing 0.6 weight percent of platinum and 0.65 weight percent of chlorine.

A second 25 gram sample of the above alumina powder was impregnated by contacting with 37.5 ml of an aqueous solution containing 0.15 gram of iridium present as iridium chloride. The slurry of alumina in iridium-containing solution was maintained for about 1 hour, thereafter water was driven off and the resulting product dried at 110° C. and then calcined for 4 hours at 250° C. to provide a material containing 0.6 weight percent of iridium and 0.33 weight percent of chlorine.

The two batches of impregnated alumina particles were then mixed in a high speed blender to yield a catalyst having an overall composition of 0.3 weight percent platinum, 0.3 weight percent iridium and 0.49 weight percent chlorine.

EXAMPLE 2

The catalyst of Example 1 was tested for reforming utilizing a charge constituting a light naphtha having the following properties:

Properties

-continued

| | |
|---|---|
| Gravity, °API | 63.4 |
| Specific Gravity | 0.7271 |
| Molecular Weight | 102.7 |
| Sulfur, ppm | 0.3 |
| Chlorine, ppm | 1 |
| Arsenic, ppb | 5 |
| ASTM Distillation, °F. | |
| IBP | 162 |
| 5% vol | 187 |
| 10% vol | 194 |
| 20% vol | 202 |
| 30% vol | 213 |
| 40% vol | 224 |
| 50% vol | 237 |
| 60% vol | 251 |
| 70% vol | 264 |
| 80% vol | 278 |
| 90% vol | 294 |
| 95% vol | 304 |
| EP | 323 |
| Composition, Wt. % | |
| Paraffins | 69.8 |
| Olefins | 0.4 |
| Naphthenes | 18.3 |
| Aromatics | 11.5 |

Reforming of the above charge was accomplished in an adiabatic three reactor system at an inlet temperature of 940° F., a pressure of 200 psig, using a weight hourly space velocity of 2.5, a recycle mole ratio of hydrogen to charge of 5 and a $H_2O$/HCl ratio of 20 added during the run to halogenate the alumina. The chloride level of the catalyst was adjusted by adding 0.2 weight percent of chlorine in the form of tertiary butyl chloride during the first two days of reforming operation.

The results obtained are shown graphically in the attached FIGURE where inlet temperature necessary to obtain a product having an octane number of 98 $C_5+R+O$ is plotted against time on stream. Comparative results obtained using the catalyst of this invention with results obtained under identical reaction conditions employing a catalyst of the same platinum and iridium content, but having highly dispersed polymetallic clusters of platinum and iridium on a single support of alumina, designated commercially as "KX-130" and prepared according to U.S. Pat. No. 3,953,368 are set forth. From the attached FIGURE, it is seen that the catalyst of the invention had a very enhanced stability as shown by its ability to maintain a high activity over an extended period of time.

It is thus evident and surprising in view of the disclosure of U.S. Pat. No. 3,953,368 that the catalyst described herein is much more active and stable than the above commerical catalyst in which platinum and iridium are present on a refractory support as bimetallic clusters. Accordingly, a reformer containing the present catalyst can process more naphtha or convert the same amount of naphtha to a higher octane quality product, than the aforenoted reforming catalyst in which platinum and iridium are present as bimetallic clusters.

It is to be understood that the above description is merely illustrative of preferred embodiments of the invention, of which many variations may be made within the scope of the following claims by those skilled in the art without departing from the spirit thereof.

What is claimed is:

1. A catalyst composition consisting essentially of a mixture of a minor proportion of platinum on a support and a minor proportion of iridium on a separate support.

2. The catalyst composition of claim 1 wherein said support is an inorganic oxide.

3. The catalyst composition of claim 1 wherein said support is alumina.

4. A catalyst composition consisting essentially of a refractory support, about 0.1 to about 5 percent by weight of platinum, about 0.1 to about 5 weight percent of iridium, about 0.1 to about 5 weight percent of halogen, wherein said platinum and iridium are contained on separate particles of said support, with the relative weight ratio of the particles containing platinum and those containing iridium being between about 10:1 to 1:10.

5. The catalyst composition of claim 4 wherein said refractory support is an inorganic oxide.

6. The catalyst composition of claim 4 wherein said refractory support is alumina.

7. The catalyst composition of claim 4 wherein said halogen is chlorine.

8. The catalyst composition of claim 4 wherein the weight ratio of particles containing platinum and those containing iridium is between about 5:1 to 1:5.

9. The catalyst composition of claim 4 wherein the size of said particles is between about 0.01 micron and about 10000 microns.

10. The catalyst composition of claim 4 wherein the size of said particles is between about 1 and about 3000 microns.

11. The catalyst composition of claim 4 wherein platinum is deposited on a support of gamma alumina and iridium is deposited on a support of eta aluminas.

12. A catalyst composition consisting essentially of a mixture of at least two components, one of said components comprising a minor proportion of platinum on a support and another of said components consisting essentially of a minor proportion of iridium on a separate support.

13. The catalyst composition of claim 12 wherein the platinum-containing component also contains an additional component selected from the group consisting of silver, osmium, copper, gold, palladium, rhodium, gallium, rhenium, germanium, tin and compounds thereof.

14. The catalyst composition of claim 12 wherein the platinum-containing component also contains rhenium in an amount between about 0.01 and about 2 weight percent.

15. The catalyst composition of claim 12 wherein said support is an inorganic oxide.

16. The catalyst composition of claim 12 wherein said support is alumina.

17. The catalyst composition of claim 12 wherein said support is gamma alumina.

18. The catalyst composition of claim 12 wherein platinum is deposited on a support of gamma alumina and iridium is deposited on a support of eta alumina.

19. A catalyst composition containing a refractory support, about 0.1 to about 5 percent by weight of platinum, about 0.1 to about 5 percent by weight of iridium and about 0.1 to about 5 weight percent of halogen, which composition is further characterized by being a mixture of particles of at least two components, one of said components comprising a minor proportion of platinum on a support and another of said components the metal content thereof consisting essentially of a minor proportion of iridium on a separate support.

20. The catalyst composition of claim 19 wherein the platinum-containing component also contains an additional component selected from the group consisting of silver, osmium, copper, gold, palladium, rhodium, gallium, rhenium, germanium, tin and compounds thereof.

21. The catalyst composition of claim 19 wherein the platinum-containing component also contains rhenium in an amount between about 0.01 and about 2 weight percent.

22. The catalyst composition of claim 19 wherein the relative weight ratio of the particles containing platinum and those containing iridium is between about 10:1 to 1:10.

23. The catalyst composition of claim 19 wherein said refractory support is an inorganic oxide.

24. The catalyst composition of claim 19 wherein said refractory suppport is alumina.

25. The catalyst composition of claim 19 wherein said refractory support is gamma alumina.

26. The catalyst composition of claim 19 wherein said halogen is chlorine.

27. The catalyst composition of claim 19 wherein platinum is deposited on a support of gamma alumina and iridium is deposited on a support of eta alumina.

28. The catalyst composition of claim 19 wherein the size of said particles is between about 0.01 micron and about 10,000 microns.

* * * * *

UNITED STATES PATENT AND TRADEMARK OFFICE
CERTIFICATE OF CORRECTION

PATENT NO. : 4,264,475
DATED : April 28, 1981
INVENTOR(S) : Hans J. SCHOENNAGEL

It is certified that error appears in the above–identified patent and that said Letters Patent are hereby corrected as shown below:

Column 3, line 66, "hydroge" is to be changed to --hydrogen--

Column 4, line 64, after "platinum" delete the hyphen

Column 5, line 46, change "effected" to "affected"

Column 7, line 37, change "$C_5$+R+O" to --$C_5^+$R+O--

Signed and Sealed this

First Day of March 1983

[SEAL]

Attest:

Attesting Officer

GERALD J. MOSSINGHOFF

Commissioner of Patents and Trademarks